June 13, 1933.  C. R. ADAMS  1,914,093
CHAIN OILER
Filed March 24, 1932
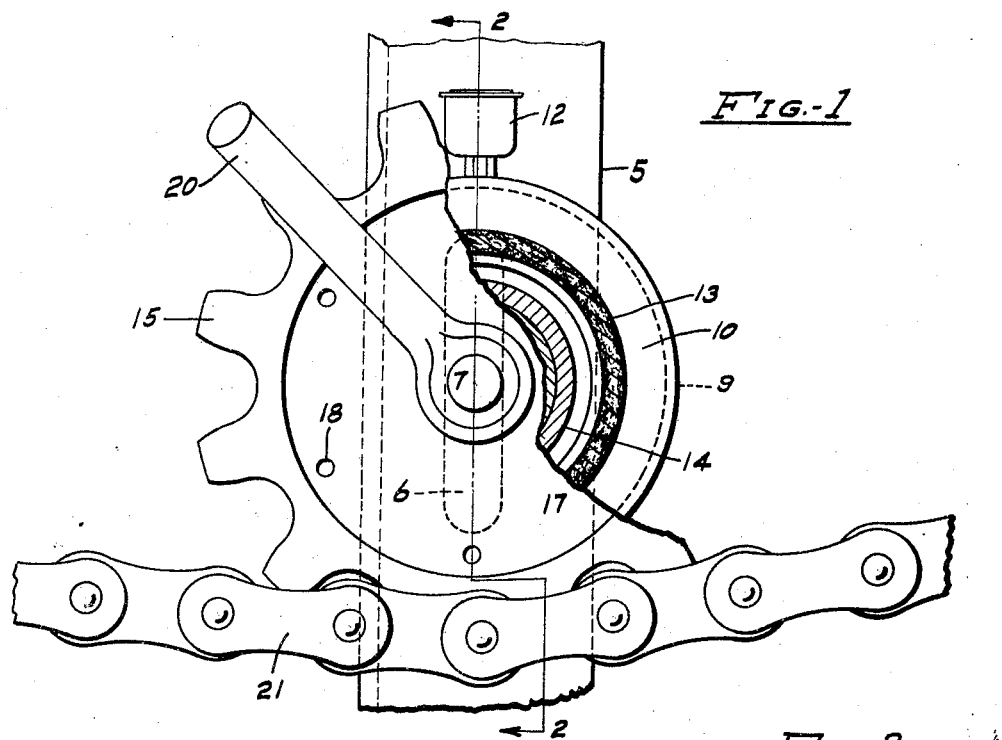
Fig.-1
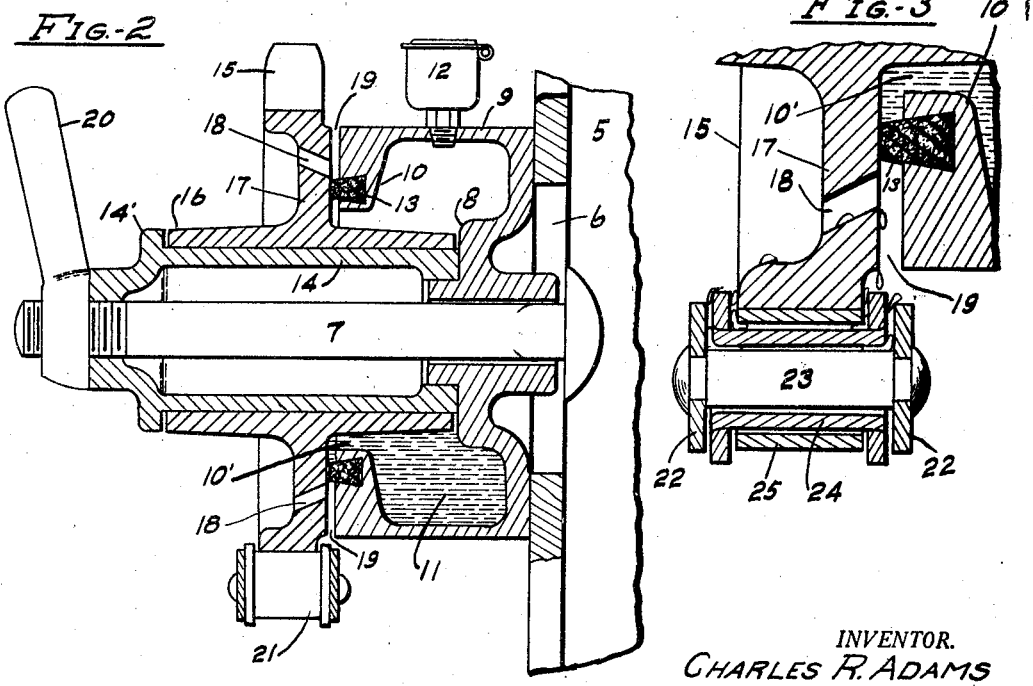
Fig.-2
Fig.-3
INVENTOR.
CHARLES R. ADAMS
BY James A. Walsh
ATTORNEY Patented June 13, 1933

1,914,093

UNITED STATES PATENT OFFICE

CHARLES R. ADAMS, OF DONAVON, SASKATCHEWAN, CANADA

CHAIN OILER

Application filed March 24, 1932. Serial No. 600,920.

In the operation of machinery employing chain drives, particularly agricultural machines exposed to weather, the links and other parts of the chains, as well as sprockets to which they are connected, unless constantly and generously supplied with oil or other lubricant, quickly wear and become distorted and otherwise unfit for service. It is customary to periodically apply lubricant to such parts by manually employed means, and frequently the timely application of such lubricant is neglected, with the result that the chain and sprocket parts, especially in hot weather, become dry and therefore quickly wear so that frequent replacement of parts or renewal of the entire chain is necessary. The object of my invention, therefore, is to prevent the difficulties referred to by providing permanent means in connection with a sprocket-and-chain system whereby the same may be constantly and at all times automatically supplied with lubricant in a manner to assure that the chain and associated parts will be thoroughly lubricated without the attention of an attendant for the purpose, which is now common, as will hereinafter more fully appear.

In the accompanying drawing I have illustrated my improvement as applied to a chain tightener for harvesters but which may be readily adapted for application to other machinery, and in which drawing Figure 1 is a fragmentary side elevation of a tightener embodying my improvement; Fig. 2, a detail section taken on the dotted line 2—2 in Fig. 1, and Fig. 3 is an enlarged detail of a portion of Fig. 2.

In said drawing the numeral 5 indicates a frame or other part of a machine or structure having a slot 6 therein through which a bolt 7 is secured, and which bolt supports a chain oiler embodying a base 8 having a circular wall 9 extending therefrom, which latter terminates in a flange 10 and with the base forms a reservoir 11 into which oil or other lubricant is introduced, as through a receptacle 12, and with which flange I employ an absorbent filler or ring 13, all as indicated in Fig. 2. A bearing 14 is mounted upon said base 8 and bolt 7, which bearing carries a sprocket 15 the hub 16 of which preferably lies between the shoulder 14' of the bearing and the base 8, the web 17 of the sprocket having one or more channels 18 therein, and with which web the ring or filler 13 contacts, said web and flange 10 being slightly spaced, as at 19, for a purpose to appear. It will be understood, of course, that a hand-nut 20 on bolt 7 may be turned to tighten the parts described as a unit, and, when slightly released, said unitary structure may be adjusted in the slot 6 for tightening or slackening chain 21 as may be required. The chain, as is common, comprises overlapping links 22 connected by pins 23 mounted in bushings 24 and about which bushings rollers 25 are rotatably mounted, the chain traveling about sprocket teeth 15 in a well known manner.

The reservoir 11 is supplied with lubricant in the manner stated or otherwise and flows over the flange 10, as at 10', into the space 19, and is intercepted and absorbed by the filler 13, from which latter it seeps to form a film or in drops as indicated in Fig. 3, some of which pass through the channels 18 in the sprocket web and into the joints of the chain parts, while other portions of the lubricant drop or are thrown directly down from the sprocket web 17 into the chain parts therebeneath, as indicated in Fig. 3, it being understood that the flow of oil from the reservoir to the porous filler 13 saturates the latter throughout its entirety. It will also be understood that lubricant seeping through the filler 13 will work along the outer surface of sprocket hub 16 and into the joint between it and bearing 14 to thus efficiently lubricate said parts, and that as the chain is traveling it prevents the accumulation of large drops of lubricant but distributes the same about the parts composing the chain and the sprocket teeth 15, so that there is no surplus lubricant carried around and discharged from the sprocket by centrifugal force. It will therefore be apparent that in the manner disclosed I provide a simple and highly efficient chain oiler especially serviceable with outdoor machinery such as harvesters and the like, exposed to sun, dust and sand, which is detrimental to the sprocket-and-chain systems thereof, as lubricants applied in the usual manner quickly dry, subjecting the operating parts to severe abrasive wear from gritty deposits of debris arising from the travel and operation of the machinery, necessitating frequent repair and replacement of the chain drive parts. With my improvement, however, lubricant is plentifully supplied constantly and automatically to a rotating sprocket, chain and its jointed parts by the transference of the oil from the reservoir in the bearing through the filler or ring 13, and its distribution is accelerated as the chain drive is in operation by centrifugal force from the sprocket hub; and in actual practice I have demonstrated that the device requires no attention other than the occasional replenishment of lubricant to the reservoir in any suitable manner.

I claim as my invention:

1. A chain oiler comprising parallel walls arranged in concentric relation and a transverse wall connecting the parallel walls, said walls constituting a lubricant container having an outlet through one of the parallel walls, and absorbent lubricating means adjacent said outlet and contacting with a rotary element for receiving lubricant flowing from the container and conducting the same to a sprocket-and-chain system.

2. A chain oiler comprising a base portion adapted to be supported upon a machine or other part, a wall extending from the base, a flange on the wall opposite said base and in concentric relation thereto, the base and said wall and flange forming a lubricant containing reservoir having an outlet through the flange, and means on the flange for conducting lubricant from the reservoir to an actuating element.

3. A chain oiler comprising a base portion adapted to be supported upon a machine or other part, a wall extending from the base, a flange on the wall opposite said base, the latter and said wall and flange forming a lubricant containing reservoir having on outlet through the flange, and absorbent means on the flange for receiving lubricant flowing from the reservoir and conducting the same to rotatable elements.

4. A chain oiler comprising a base portion adapted to be supported upon a machine or other part, a wall extending from the base, a flange on the wall opposite the base, the latter and said wall and flange constituting a lubricant containing reservoir having an outlet through the flange, and a porous filler on the flange for receiving lubricant flowing from the reservoir and conducting the same to parts requiring lubrication.

5. A chain oiler comprising a base and a wall extending therefrom, a flange extending from the wall, said parts constituting a lubricant container having an outlet through the flange, a rotatable element having perforations therethrough supported by said base, and a lubricant conductor supported by the flange and engaging said element for leading lubricant from the container through the perforations in said element.

6. A chain oiler comprising a base portion adapted to be supported upon a machine or other part, a wall extending from the base, a flange extending inwardly from the wall, the latter and said wall, a flange constituting a lubricant container having an outlet through the flange, a bearing supported on the base, a rotatable element mounted on the bearing in promixity to the flange, and means supported by the flange and engaging said element for receiving lubricant flowing from the container and conducting the lubricant between the flange and element.

7. A chain oiler comprising a base, a wall extending therefrom, a flange extending inwardly from the wall, the latter and said base and flange constituting a lubricant container having an outlet through the flange, a bearing mounted on the base, a rotary element supported on the bearing adapted to actuate a chain, and means secured to the flange for receiving oil flowing from the container and conducting it to the rotary element and chain.

In testimony whereof I affix my signature.

CHARLES R. ADAMS.